June 6, 1961
H. E. RADACK
2,987,214
WEATHERPROOF, PROTECTIVE COVERING FOR
ELECTRICAL WIRING DEVICES
Filed Feb. 2, 1960
2 Sheets-Sheet 1
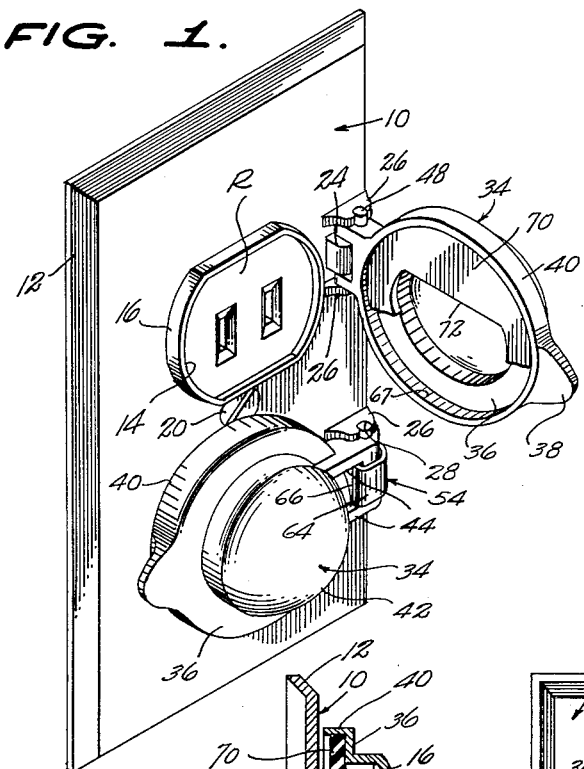
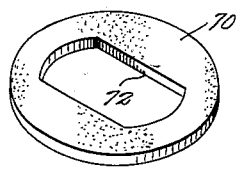
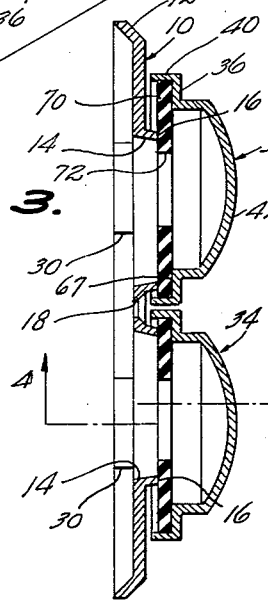
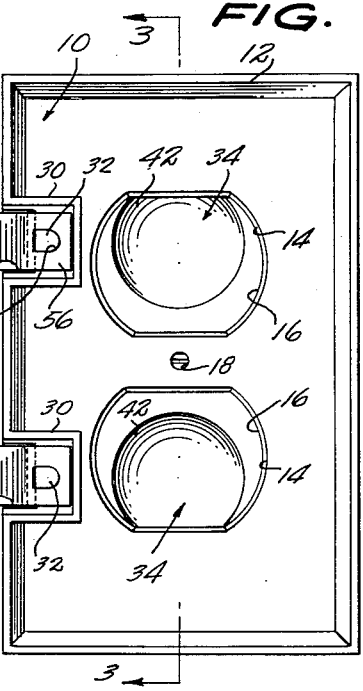
INVENTOR.
HARRY E. RADACK,
BY Frederick A. Goda
ATTORNEY

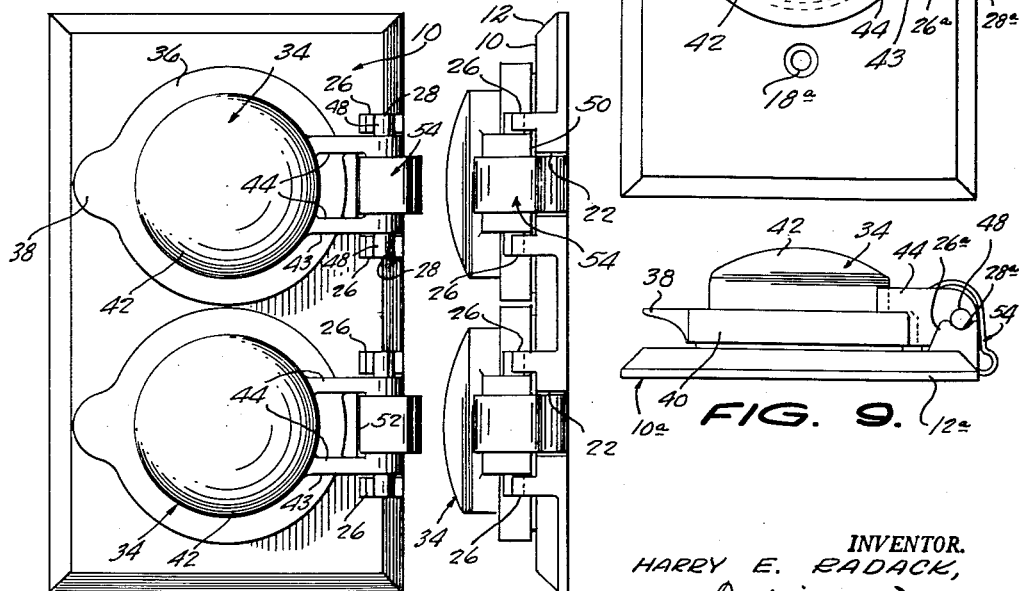

United States Patent Office 2,987,214
Patented June 6, 1961

2,987,214
WEATHERPROOF, PROTECTIVE COVERING FOR ELECTRICAL WIRING DEVICES
Harry E. Radack, Trenton, N.J., assignor to Circle F Mfg. Co., Trenton, N.J., a corporation of New Jersey
Filed Feb. 2, 1960, Ser. No. 6,215
6 Claims. (Cl. 220—243)

This invention relates generally to electrical wiring devices. More particularly, the invention has reference to a protective, weatherproof covering means for receptacles, switches, and other electrical articles of manufacture.

By way of background, it may be observed that for the purpose of sealing wiring devices against the admission of moisture, weatherproof covers have long been in use. It is common to provide a wall plate for the receptacle or other wiring device, said wall plate having an opening through which the wiring device is exposed, the construction being such that the opening is normally closed by a cover hinged to the wall plate. Bounding the opening of the wall plate is a low, upstanding wall, and this is sealably contacted, throughout the periphery of the hinged cover, by a rubber gasket carried by the cover on the under side thereof.

It is also known to provide a spring means, mounted upon the wall plate in a position bearing against the cover, said spring means being stressed to bias the cover into a sealing position in respect to the wall surrounding the opening. Said spring means serves the additional function of an indexing spring, in that it releasably retains the cover in its open position.

While a construction as broadly discussed above is known in this particular art, it has been found that the arrangement involves an excessive number of parts, and an excessive number of assembly steps. The result is that the over-all cost of the device is increased, and this is obviously undesirable in view of the fact that the weatherproof covers must be competitively priced at the lowest possible figure, else they will not find commercial success.

In view of the above, the broad object of the present invention is to provide a weatherproof, protective covering of the character described above, which will be novelly designed in such a manner as to reduce the number of parts required for the device, while at the same time reducing the number of assembly steps, thus to permit mass production of the protector at a minimum cost.

Another object is to achieve the low-cost production of the weatherproof protector for electrical wiring devices, without sacrifice of efficiency thereof in exerting a sealing action when in its normal closed position. It is proposed, in fact, to increase the sealing action, if anything, through a novel formation and relative arrangement of the spring and cover, designed to produce a maximum bias of the cover in relation to the size and tensile value of the spring.

In carrying out the invention, it is proposed to form the weatherproof, protective covering from a minimum number of parts. In a typical embodiment, of the single-opening type, the invention thus includes the wall plate, a cover pivoted thereon, and a spring which is in embracing relation to the cover and plate, in such a manner as to hold the same assembled with each other, without requirement of any additional fastener or connector means. The spring, in said embodiment of the invention, thus constitutes a means for connecting the cover to the plate, a means for biasing the cover to its normal, closed position, and an indexing means for releasably holding the cover in its open position.

In said typical embodiment, the invention may be further summarized as incorporating trunnions upon the cover, seating in shallow recesses provided in ears formed upon the wall plate. In devices of this type already known, it has been necessary to perform special assembly operation, after seating of the trunnions in the recesses, involving the pinching, so to speak, of the bearing ears to partially close the recesses above the trunnions, whereby to prevent the separation of the cover from the plate. In accordance with the present invention, however, the trunnions are merely positioned within the recesses, after which the assembly of the spring with the plate and cover will be automatically operative to retain all of the components of the invention in their assembled relationship.

Another object of the invention is to provide a weatherproof, protective covering as stated which will be rugged despite its relatively low cost, will be trouble-free in operation, and will be usable in association with conventional wiring devices of various types.

Yet another object of importance is to provide a weatherproof, protective covering as stated which will be so designed as to include a maximum number of components interchangeable as between single-outlet and multi-outlet weatherproof coverings or protectors.

Other objects will appear from the following description, the claims appended thereto, and from the annexed drawing, in which like reference characters designate like parts throughout the several views, and wherein:

FIGURE 1 is a perspective view of a duplex, weatherproof covering in accordance with the present invention, one of the covers being in open position exposing a portion of a duplex receptacle to which the covering is applied, a gasket being partly broken away;

FIGURE 2 is an elevational view of the weatherproof protector as seen from the back thereof, the sealing gaskets being removed;

FIGURE 3 is a longitudinal sectional view taken substantially on line 3—3 of FIGURE 2;

FIGURE 4 is an enlarged, transverse sectional view approximately on line 4—4 of FIGURE 3, with the cover in closed position;

FIGURE 5 is a fragmentary sectional view on the same scale and cutting plane as FIGURE 4, in which the cover has been moved to its open position;

FIGURE 6 is a front elevational view of the protective covering on the same scale as FIGURE 2;

FIGURE 7 is an edge elevational view thereof as seen from the right in FIGURE 6;

FIGURE 8 is a front elevational view of a modified form in which the covering is of the single-opening type, a portion of the hinged cover being broken away;

FIGURE 9 is an end elevational view of the protector or covering shown in FIGURE 8, with the cover in closed position; and FIGURE 10 is a perspective view of a rubber gasket used in the device, per se.

Referring to the drawing in detail, in the form of the invention shown in FIGURES 1–7, the weatherproof covering for electrical wiring devices is of the duplex type. Thus, it can be associated with a conventional duplex receptacle R. Then again, it could be used with a duplex switch, or with a duplex combination including one switch and one receptacle. In the form of the invention shown in FIGURES 8 and 9, the covering is designed for use with a single receptacle or single switch. Possibly, the device might be applied to various other types of electrical articles of manufacture, and it wil be understood that the term "electrical wiring device" as used herein is intended to apply to any of the electrical products commonly grouped together under this generic designation in the field of manufacture to which the invention relates.

In any event, in the first form of the invention there is illustrated a wall plate 10 having the usual rearwardly projecting, peripheral flange 12.

In this form of the invention, the wall plate is provided with a pair of straight-sided openings 14, designed to receive the complementarily formed face portions of the conventional duplex receptacle R. Said complemental portions of the receptacle would be bounded by continuous, low walls 16 bounding the openings 14. The walls 16 project forwardly beyond the face portion of the receptacle.

Midway between the openings 14, there is provided the usual small aperture 18, designed to receive a mounting screw 20.

Formed in one of the longitudinal edges of the plate, adjacent the respective openings 14, are rectangularly-shaped recesses 22. As will be noted, from FIGURE 2, said recesses are not disposed with their centers aligned transversely of the plate with the centers of the openings 14. Rather, the recesses are slightly offset in respect to the openings, in a direction toward the respective, adjacent ends of the plate.

Integral or otherwise made rigid with the plate, along the inner edges of the recesses 22 (see FIGURES 4 and 5) are upstanding projections 24, constituting stops for the hinged covers, in a manner to be made presently apparent.

The projections 24, in a preferred embodiment of the invention, extend across the full width of the recesses 22, and are formed with overhangs at the sides bounding the recesses, whereby to define shoulders 25. As will be noted from FIGURES 4 and 5, the shoulders 25 face into the recesses 22, and are inclined slightly in respect to the general plane of the plate 10.

Designated at 26 are ears, integral or otherwise made rigid with the wall plate, said ears projecting outwardly from the front surface of the wall plate at opposite sides of the respective recesses 22. The ears constitute bearing means for the pivoted cover, and accordingly, are formed with comparatively shallow, approximately semicircular bearing recesses 28 opening in a direction away from said front surface of the wall plate.

Heretofore, it has been proposed that deep bearing recesses be provided, in order that the walls of the bearing recesses may be moved toward one another after assembly of the cover with the wall plate, to prevent separation of the cover from said plate. In accordance with the present invention, this is not necessary, and as will be noted, it is sufficient to provide comparatively shallow recesses, the depth of which need be no greater than that required to provide for rotatable movement of the cover trunnions seated therein.

At 30 I have designated like rectangular flanges, integrally formed upon the back surface of the wall plate, and extending about the respective recesses 22. The flanges 30 merge into the peripheral flange 12, and thus there is a continuous seal extending about the full periphery of the wall plate. The flanges 30 are desirable, in order to prevent moisture from entering into the space at the back of the plate through the recesses 22.

Also integrally formed upon the back surface of the wall plate are rearwardly projecting bosses 32, which in a preferred embodiment are of noncircular configuration, as shown to particular advantage in FIGURE 2.

This completes the construction of the plate 10, and it is accordingly appropriate to consider the particular construction of the covers or lids assembled with said plate. Said covers are identical to each other, and have been generally designated at 34. Accordingly, the description of one will suffice for both.

Cover or lid 34 includes a body portion 36, adapted to protectively overlie the opening 14 with which it is associated. Body portion 36 is integrally formed, on its periphery, with a forwardly projecting lifting tab 38, to facilitate grasping of the cover when the same is to be moved from one of its extreme positions to its other extreme position.

Depending from the body portion 36 is a continuous marginal flange or skirt 40, the diameter of which is substantially greater than the maximum dimension of the opening 14, in order to insure that the wall 16 of the opening will be wholly received within, and will be spaced inwardly to a slight extent from, the depending skirt.

As will be understood, the body portion of the cover is so shaped as to insure that it will accommodate any of various electrical wiring devices, without interfering with the full sealing action that is desired when the cover is in closed position. Thus, in some instances the cover might overlie a switch, in which event the body portion would obviously be proportioned in such a way as to completely clear the outwardly projecting switch handle, which would extend through the opening 14. In the case of a receptacle as shown in FIGURE 1, this problem does not, of course arise.

In order to insure that the cover will accommodate any electrical wiring device with which it would normally be expected to be used, I provide a domed center portion 42 on the cover, comprising a part of the body portion 36 thereof. In the illustrated example, the center portion is of circular, outwardly convex form. However, it is obvious that the shape of said domed portion could be varied as desired. Thus, in some embodiments the center portion might be of rectangular, elongated form, so that it will receive a switch handle. These refinements, it is believed, are sufficiently obvious as not to require special illustration herein.

Also integral with the body portion of the cover is a tongue 43. This extends outwardly from the body portion, at a location diametrically opposite the lifting tab. Tongue 43, in the illustrated example, includes transversely spaced, parallel arms 44, integral at their outer ends with a connecting portion 46 extending therebetween. Integral with the tongue, at opposite sides thereof, are cylindrical trunnions 48, proportioned to seat in the recesses 28. In the invention, as previously mentioned herein, it is not necessary that the trunnions be wholly recessed, and thus, the top parts of the trunnions project above the recessed ears.

At its distal extremity, tongue 43 is formed with a depending, wide lip 50 (FIGURE 4), the purpose of which will be made apparent hereinafter.

It is also desirable to strengthen the cover to the maximum extent, and in the illustrated example, a web 52 is integral with and extends between the arms 44, said web projecting outwardly from the bottom edge of the skirt or flange 40 (see FIGURES 4 and 5).

In accordance with the present invention, the cover is assembled with the plate, without requirement of using special fasteners, pinching of the ears above the trunnions, or other expedients. Rather, I provide a wide leaf spring 54, shaped as shown to particular advantage in FIGURE 4. Said spring is of roughly C-shape, opening in a direction toward the cover, and disposed in embracing relation to the tongue and the adjacent, recessed edge portion of plate 10.

Thus, the spring 54 includes a flat base part 56, constituting a first end portion of the spring disposed in face-to-face contact with the back surface of the plate 10. The base part 56 of the spring is centrally formed with an aperture or opening 58 mating with the boss 32 so as to receive the same, thus to connect the base part of the spring to the back surface of the plate. The spring is thus swiftly and easily assembled with the plate, without requirement of rivets or other fastener means, and is efficiently retained in place, throughout the normal life of the weatherproof, protective covering. The spring, at its base end, extends within the recess 22, and is then projected out of the open side of the recess, in the form of a spring loop 60 constituting a part of a bight portion or body part 62 of the spring. The bight portion 62 merges, at the end thereof remote from the spring loop, into a forwardly projecting distal end portion 64, which is disposed angularly to the bight part, and is merged into the bight part along a curving path. At its forward extremity, the end portion 64 is provided with an inwardly turned retaining lip 66, engaging against the inner side of the connecting portion 46 of the tongue.

The end portion 64, as clearly shown in the several figures of the drawing, is in overlying relation to the tongue, in particular the connecting portion 46 of the tongue. As a result, the end portion 64 constitutes an abutment, disposed in a position effective to constitute the same as a hold-down for the tongue. The abutment so constituted by the end portion 64 limits the cover against separation from the wall plate, since the abutment engages the tongue in such a way as to prevent the trunnions from moving out of the recesses. When the parts are assembled as in FIGURE 4, the three components thereof, namely, the wall plate, spring, and cover, are all interengaged against relative separation, while still being free to move between the FIGURE 4 and FIGURE 5 positions thereof.

FIGURES 4 and 5 show that the locus of the engagement between the tongue portion 46 and spring portion 64 is radially spaced from trunnions 48, and moves over center with respect to the pivot axis of the lid during movement of the lid between its closed and open positions. Thus the spring indexes the lid between said positions.

Analyzing the operation depicted in FIGURES 4 and 5, one sees that in FIGURE 4, end portion 64 of the spring extends above the trunnions, projecting across the axis or center of pivotal movement of the lid. The trunnions are thus held against movement out of the recesses 28, despite the fact that the open ends of the recesses are wider than the diameter of the trunnions.

In the open, FIGURE 5 position of the lid, one sees that the interengagement of shoulder 25 and lip 50 occurs below the trunnions when viewed as in FIGURE 5, while the locus of the contact between the spring and tongue is above the trunnions, approximately diametrically opposite the interengaging shoulder and lip. As a result, the spring is still exerting a downward pressure tending to seat the trunnions. However, the interengaging shoulder and lip are now brought into a cooperating relationship with the spring, in that they constitute an interlock of the lid and plate effective to prevent upward movement of the trunnions in a wholly vertical direction or in an inclined line extending from the pivot axis of the lid at the left of a vertical line intersecting said axis. The spring portion 64, meanwhile, aids in preventing upward, vertical movement of the trunnions and blocks upward movement of the same along an inclined path extending from the pivot axis at the right of said vertical line.

The provision of the depending skirt 40 on the body portion of the cover is effective to define a recess 67 on the under side of the cover, proportioned to receive a soft rubber gasket 70 (FIGURE 10). When the gasket is engaged in the recess 67 of the cover, and the cover is moved to a closed position, said gasket will exert a sealing action upon the wall 16, through the full circumference of the opening 14. This prevents the admission of moisture to the interior of the electrical wiring device.

The gasket 70 has an elongated opening 72, which is provided in case the wiring device has a projection extending through the opening 14. This would be true, for example, in a case of a switch having the usual handle extending outwardly through the opening 14. The gasket 70, of course, still exerts a sealing action against the wall 16, through the full periphery of the opening 14. The gasket can be positioned with its opening extending either transversely or longitudinally of the wall plate, according to the direction of movement of the handle.

As will be noted from FIGURE 2, wherein the gaskets have been removed for the purpose of showing the details of the under sides of the covers, the covers are not symmetrically disposed in respect to the openings 14. They are proportioned, however, to insure that they will receive the walls 16, and exert a full sealing action thereon. Further, the domed portions are still located in positions effective to provide clearance for switch handles and the like, even though said domed portions are offset with respect to the centers of the openings 14.

In FIGURES 8 and 9, the invention is illustrated, embodied in a single-unit wall plate 10a, formed with a peripheral flange 12a, and with a single, centrally disposed opening 14a bounded by an upstanding, low, continuous wall 16a. In FIGURE 8, the opening 14a, is fully circular, rather than of the flat-sided formation illustrated for the openings 14 in the first embodiment of the invention. However, as will be understood, the opening 14a could be of flat-sided formation. Conversely, the openings 14 in the first form could be of wholly circular formation, in certain embodiments, quite possibly.

At opposite sides of the opening 14a, there are provided countersunk apertures 18a, adapted to receive mounting screws, not shown in FIGURES 8 and 9.

It will be understood that in this form of the invention, there would be the same arrangement, with respect to the mounting of the spring and of the hinged cover, as in the first form of the invention. Thus, there is a recess 22a formed identically to the recess in the first form of the invention, and extending into said recess is the base portion of the spring 54, which base portion is mounted upon the plate in the same manner as in the first form of the invention. Still further, there are upstanding ears 26a, having shallow bearing recesses 28a receiving the trunnions 48 of the hinged cover 34.

The cover 34 is identical to the cover shown in the first form, so that manufacturing costs are reduced, through the use of interchangeable covers as between single-unit and multi-unit wall plates.

The construction shown in FIGURES 8 and 9, thus, is identical in every respect to the first form, except for the shape of the opening 14a, which as noted above, can be varied. Another difference resides in the fact that in the second form, the cover 34 is symmetrically disposed in respect to, that is, is concentric with, the opening 14a. It follows that the recess 22a, and the ears 26a, are symmetrically related to the center of the opening 14a.

The functioning of the single-unit form is, of course, identical to that of the first form of the invention, in respect to the indexing and biasing characteristics of the spring, the releasable retention of the cover in its open position, etc.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any changes in construction that may be permitted within the scope of the appended claims.

What is claimed is:

1. A weatherproof protector for wiring devices comprising: a wall plate proportioned to cover a wiring device, said plate including an abutment and having an opening adjacent the abutment providing access to the covered device; bearing means on the plate adjacent said opening, having aligned bearing recesses opening at one end in a direction away from the plate; a lid for said opening of the plate including a tongue formed with an abutment and trunnions on the tongue journalled in the respective recesses, for pivoting of the lid between a closed position and an open position in which the abutments engage each other to limit the lid against movement beyond its open position, said open ends of the recesses being greater in width than the diameter of the trunnions; and a roughly C-shaped leaf spring embracing the plate and tongue and having a first end portion anchored to the plate, said spring having a second, free end portion overlying the tongue above the trunnions in slidable contact with the tongue at a locus radially spaced from the trunnions, said locus moving over center in respect to the pivot axis of the lid during travel of the lid between its closed and open positions, thus to index the lid to said positions, said free end portion of the spring extending over center in respect to said axis above the trunnions in the closed position of the lid to engage the trunnions against movement out of the recesses in said closed position, said abutments engaging each other below the trunnions opposite said locus, in the open lid position, to cooperate with the free end portion of the spring in engaging the trunnions against movement out of the recesses when the lid is in its open position.

2. A weatherproof protector for wiring devices comprising: a wall plate proportioned to cover a wiring device, said plate having a front face formed integrally with a forwardly projecting abutment, said plate having a back face formed integrally with a rearwardly projecting boss, the plate having an opening adjacent said abutment and boss, said opening providing access to the covered device; bearing means on the plate adjacent said opening having aligned bearing recesses opening at one end in a direction away from the plate; a lid for said opening of the plate including a tongue formed with an abutment and trunnions on the tongue journalled in the respective recesses, for pivoting of the lid between a closed position and an open position in which the abutments engage each other to limit the lid against movement beyond its open position, said open ends of the recesses being greater in width than the diameter of the trunnions; and a roughly C-shaped leaf spring embracing the plate and tongue, said spring having a first end portion underlying said back face and formed with an aperture receiving the boss, the spring having a second, free end portion overlying the tongue above the trunnions in slidable contact with the tongue at a locus radially spaced from the trunnions, said locus moving over center in respect to the pivot axis of the lid during travel of the lid between its closed and open positions, thus to index the lid to said positions, said free end portion of the spring extending over center in respect to said axis above the trunnions in the closed position of the lid to engage the trunnions against movement out of the recesses in said closed position, said abutments engaging each other below the trunnions opposite said locus, in the open lid position, to cooperate with the free end portion of the spring in engaging the trunnions against movement out of the recesses when the lid is in its open position.

3. A weatherproof protector for wiring devices as in claim 2 wherein the plate is formed with a peripheral sealing flange extending rearwardly from the back surface of the plate, said plate including a rectangular flange extending about the boss in close proximity to said first end portion of the spring, said flanges being merged into one another to provide a continuous marginal seal upon the plate.

4. A weatherproof protector for wiring devices comprising: a wall plate proportioned to cover a wiring device, said plate having a front face formed integrally with a forwardly extending projection having a distal extremity formed with a rearwardly facing shoulder, spaced forwardly from the front face of the plate, said plate having an opening adjacent said projection to provide access to the covered device, the plate having a back face integrally formed with a rearwardly projecting boss; a pair of ears integrally formed upon and projecting forwardly from the front face of the plate at opposite sides of said shoulder, said ears having aligned bearing recesses opening at one end in a direction away from the plate; a lid for said opening of the plate including a body portion proportioned to overlie the opening, a tongue integral at one end with the body portion and extending between said ears, said tongue being formed with a lip at its other end, and trunnions on the tongue journalled in the respective recesses, for pivoting of the lid between a closed position, and an open position in which the lip underlies the shoulder in engagement therewith to limit the lid against movement beyond its open position, said open ends of the recesses being greater in width than the diameter of the trunnions, said shoulder and lip defining abutments interengaging each other in the open position of the lid; and a roughly C-shaped leaf spring embracing the plate and tongue, said spring having a first end portion underlying said back face and formed with an aperture receiving the boss, the spring having a second, free end portion overlying the tongue above the trunnions in slidable contact with the tongue at a locus radially spaced from the trunnions, said locus moving over center in respect to the pivot axis of the lid during travel of the lid between its closed and open positions, thus to index the lid to said positions, said free end portion of the spring extending over center in respect to said axis above the trunnions in the closed position of the lid to engage the trunnions against movement out of the recesses in said closed position, said abutments engaging each other below the trunnions opposite said locus, in the open lid position, to cooperate with the free end portion of the spring in engaging the trunnions against movement out of the recesses when the lid is in its open position.

5. A weatherproof protector for wiring devices comprising: a wall plate proportioned to cover a wiring device, said plate having a front face formed integrally with a forwardly extending projection having a distal extremity formed with a rearwardly facing shoulder, spaced forwardly from the front face of the plate, said plate having an opening adjacent said projection to provide access to the covered device, the plate having a back face integrally formed with a rearwardly projecting boss; a pair of ears integrally formed upon and projecting forwardly from the front face of the plate at opposite sides of said shoulder, said ears having aligned bearing recesses opening at one end in a direction away from the plate; a lid for said opening of the plate including a body portion proportioned to overlie the opening, a tongue integral at one end with the body portion and extending between said ears, said tongue being formed with a lip at its other end, and trunnions on the tongue journalled in the respective recesses, for pivoting of the lid between a closed position, and an open position in which the lip underlies the shoulder in engagement therewith to limit the lid against movement beyond its open position, said open ends of the recesses being greater in width than the diameter of the trunnions, said shoulder and lip defining abutments interengaging each other in the open position of the lid; a leaf spring including a flat first end portion disposed in face-to-face contact with the back face of the plate and formed with an aperture receiving said boss, said spring including a generally flat second, free end portion overlying the tongue above the trunnions in slidable contact with the tongue at a locus radially spaced from the trunnions, said locus moving over center in respect to the pivot axis of the lid during travel of the lid between its closed and open positions, thus to index the lid to its respective positions, the spring including a bight portion connecting said end portions and formed adjacent the first end portion with a spring loop stressed to bias the end portions of the spring toward the back face of the plate and the tongue respectively, said free end portion of the spring extending over center in respect to said axis above the trunnions in the closed position of the lid to engage the trunnions against movement out of the recesses in said closed position, said abutments engaging each other below the trunnions opposite said locus, in the open lid position, to cooperate with the free end portion of the spring in engaging the trunnions against movement out of the recesses when the lid is in its open position.

6. A weatherproof protector for wiring devices as in claim 5, wherein the respective end positions of the spring, in the closed position of the cover, extend in substantial parallelism in paths approximately equidistant from the pivot axis of the lid, the abutments engaging in the area between the first end portion of the spring and said pivot axis.

References Cited in the file of this patent

UNITED STATES PATENTS

| | | |
|---|---|---|
| 849,249 | Lawless | Apr. 2, 1907 |
| 2,200,399 | Primas | May 14, 1940 |
| 2,404,558 | Yellin | July 23, 1946 |
| 2,697,537 | Wetherell | Dec. 31, 1954 |
| 2,870,933 | Winter | Jan. 27, 1959 |